United States Patent
Foering et al.

[11] Patent Number: 6,131,956
[45] Date of Patent: Oct. 17, 2000

[54] PIPE COUPLING

[75] Inventors: Herbert Foering, Solingen; Thomas Gigowski, Grevenbroich; Michael Berane; Karl-Heinz Hartings, both of Langenfeld; Johannes Schurr, Bonn, all of Germany

[73] Assignee: Mannesmann AG, Düsseldorf, Germany

[21] Appl. No.: 09/297,152

[22] PCT Filed: Oct. 24, 1997

[86] PCT No.: PCT/DE97/02556

§ 371 Date: Apr. 26, 1999

§ 102(e) Date: Apr. 26, 1999

[87] PCT Pub. No.: WO98/19092

PCT Pub. Date: May 7, 1998

[30] Foreign Application Priority Data

Oct. 25, 1996 [DE] Germany ............... 196 45 152

[51] Int. Cl.[7] .................................................. F16L 35/00
[52] U.S. Cl. ........................ 285/93; 285/370; 285/379; 285/382.2
[58] Field of Search ............... 285/23, 379, 380, 285/382, 382.1, 382.2, 381.3, 381.5, 93, 370

[56] References Cited

U.S. PATENT DOCUMENTS

| | | | |
|---|---|---|---|
| 1,938,286 | 12/1933 | Elliott et al. ............... | 285/379 |
| 3,427,053 | 2/1969 | Dunlap et al. ............. | 285/379 |
| 5,080,404 | 1/1992 | Sauer ........................ | 285/256 |
| 5,314,210 | 5/1994 | Calmettes ................. | 285/379 |

Primary Examiner—Dave W. Arola
Attorney, Agent, or Firm—Cohen, Pontani, Lieberman & Pavane

[57] ABSTRACT

A pipe coupling comprises a cylindrical pipe, whose smooth end section can be slipped onto a fitting that has at least one sleeve-like area extending in the longitudinal direction At least one sealing ring is arranged between the pipe and the fitting. The fitting and the pipe are securely connected to each other by means of an externally applied pressing tool, which acts in a plastically deforming manner on at least one radial plane on the pipe as well as the fitting section located below it. Between the fitting outer wall and the pipe inner wall is arranged a metal sleeve (31), which can be slipped onto the fitting by force. The fixed axial extension of the metal sleeve (31) encompasses the length of the fitting (1) The length of the metal sleeve is selected so as to correspond to the required overlap between the pipe (2.1, 2.2) and the fitting This required overlap is attained when, after placement of the pipe end region onto the metal sleeve (31), or after insertion of the fitting together with the previously slipped-on metal sleeve (31) into the pipe end region, the end face (9, 10) of the pipe end region facing the fitting (1) coincides exactly with a marking on the metal sleeve (31) or a stop. The sealing ring (32, 33), seen in cross-section, is penetrated by the metal sleeve (31).

7 Claims, 1 Drawing Sheet

PIPE COUPLING

BACKGROUND OF THE INVENTION

1. Field of the Invention

The invention relates to a pipe coupling for a cylindrical pipe, whose smooth end section can be slipped onto a fitting.

2. Description of the Prior Art

A generic pipe coupling from the Geberit Company is known. In this system, a so-called composite pipe is slipped onto a red brass fitting. The composite pipe comprises an inner pipe with an aluminum mantle that transports the fluid. Over the inner pipe, a sheathing pipe provides external protection. The inner pipe and the sheathing pipe are made of plastic. The fitting has a region extending in the longitudinal direction that is equipped with a stop, up to which the connecting pipe is slipped. The region adjacent to the stop has two internal grooves, in each of which a sealing ring is arranged. The remaining section is sharply contoured, so that the slipped-on pipe can be molded into the contour during pressing. After the pipe is slipped on, a pressing clamp is externally applied to the pipe and presses it in the sealing ring region as well as in the contoured region. The sealing ring region thereby performs the sealing function, while the contoured area is responsible for axial securing. It is disadvantageous in this system that the fitting is expensive to produce, because the contoured end regions as well as the sealing ring region must be manufactured with precision.

A differently designed pipe coupling is disclosed in DE 43 29 442 A1. This pipe coupling has an elongated metal sleeve that forms a fitting, into which are inserted two pipes to be connected, which are of equal diameter. The metal sleeve, which has a diameter somewhat larger than that of the pipes, is beaded in the edge regions in such a way that the sleeve edges rest on the pipe walls without any gaps. The space between the sleeve and the pipe walls is filled by a rubber collar placed securely in the sleeve. After insertion of the pipes, crimps are pressed into the sleeve wall with a pressure such that crimps of equal area are created in the pipe walls. It is disadvantageous in this system that the broad pressing jaw requires a great deal of space, so that pressing is impossible in close quarters. In addition, for most of the fittings, particularly in the case of T-pieces, an extension is needed so that the pressing clamps can be applied. In systems with an external fitting, it is also disadvantageous that after insertion of the pipe into the fitting, it can no longer be determined externally whether the pipe has reached the prescribed insertion depth.

SUMMARY OF THE PRESENT INVENTION

The object of the invention is to provide a generic pipe coupling, in which the required insertion depth and/or the required overlap between the pipe and the fitting can be recognized after the insertion or slip-on process. A further object is to design the fitting in such a way that it is more economical to manufacture than previously known solutions.

This object is attained by a pipe coupling, comprising a cylindrical pipe having an end section, a sleeve-shaped fitting having first and second end faces, said end of said cylindrical pipe inserted on said fitting over one of said first and second end faces, a first sealing ring arranged radially between said fitting and said pipe, a metal sleeve forcibly inserted over said fitting and having an axial extension encompassing a length of said fitting between said first and second end faces, said metal sleeve penetrating a cross section of said first sealing ring, said metal sleeve comprising an indicator selected from the group including a mark on said metal sleeve and a stop extending radially outward from said metal sleeve, said indicator arranged on said metal sleeve such that said end of said pipe overlaps said fitting by a required overlap length when said end of said pipe is aligned with said indicator, and said pipe and said fitting being securely connectable by an externally applied pressing tool when said pipe is properly inserted over said fitting.

Instead of a sealing collar, the present invention comprised a metal sleeve arranged between the pipe inner wall and the fitting outer wall, whereby the sealing ring, seen in cross-section, is penetrated by the metal sleeve. Preferably, a sealing ring is arranged in both end areas of the metal sleeve. As with the sealing collar of the prior art, the length of the metal sleeve according to the present invention corresponds to the required overlap between the pipe and the fitting. In addition, the metal sleeve, to permit visual recognition of the required overlap, has two sections visually distinguishable from each other from the outside. The first section, which extends from the fitting end face, corresponds to the required overlap between the pipe and the fitting. This section or marking is followed by a shorter control section. Preferably, the two sections are distinguishable from each other by color. The accurate positioning of the metal sleeve is also ensured by providing the metal sleeve, at one end, with a stop that extends radially inward and covers the fitting end face. Alternatively or in addition, the metal sleeve, in the center, has a stop that extends radially outward. To prevent the metal sleeve from moving after being put in place, there is at least one support element directed radially inward. To make it easier to slip on the pipe end region, or to insert the fitting along with the slipped-on metal sleeve into the pipe end region, it is proposed that the fitting, seen from the center, have a conicity that decreases toward both sides.

The fitting and/or pipe can be produced in C-steel, noble steel, titanium, aluminum, brass, plastic or composite materials.

The main advantages of the proposed pipe coupling can be summarized as follows:

Required overlap between pipe and fitting can be checked from outside.

Small structural size of fitting.

Compensation of manufacturing tolerances when the Z-measure method is used for preassembly.

Less force required from pressing clamps.

Multi-plane pressing is possible.

Fitting is simpler to manufacturer.

Lower production expense.

Preassembly of fitting and seal is possible.

BRIEF DESCRIPTION OF THE DRAWINGS

The pipe coupling according to the invention is described in greater detail below in reference to two examples shown in the drawings. The drawings show.

DETAILED DESCRIPTION OF THE PREFERRED EMBODIMENT

Figure 1:
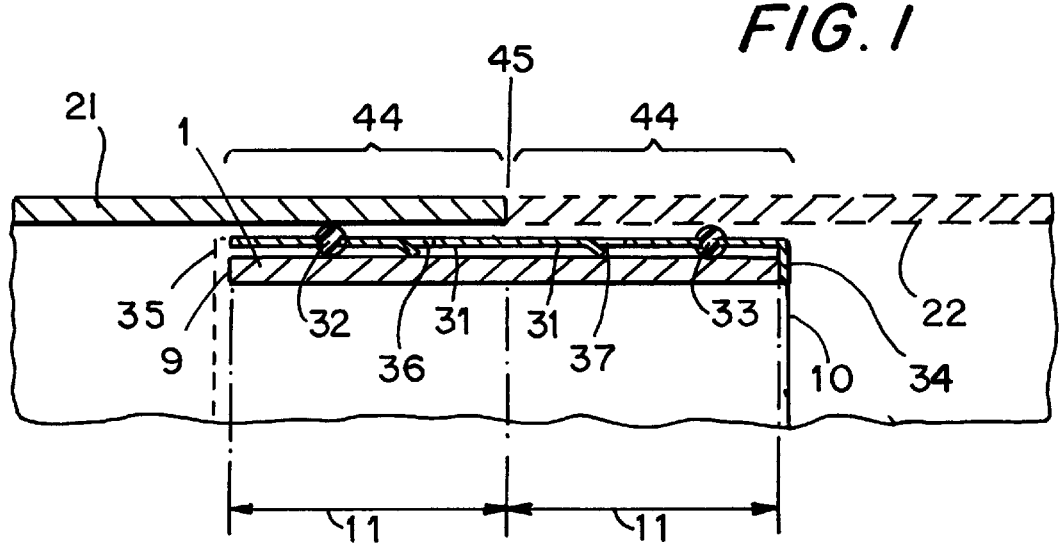
FIG. 1 is a longitudinal sectional view of a first example of the pipe coupling according to the present invention.

FIG. 1 shows a first example of the pipe coupling according to the invention. Instead of a sealing collar, a metal sleeve 31 is arranged between the two pipes 2.1, 2.2 and the fitting 1. In this example, the metal sleeve 31 is equipped at each end area with a sealing ring 32, 33. To make the seal effective, both sealing rings 32, 33 are arranged on the metal sleeve 31 such that cross sections of the sealing ring 32, 33 are penetrated by the metal sleeve 31. Further, the metal sleeve 31 in this example has a radially inwardly extending first stop 34 that covers a fitting end face 10. This stop 34 ensures accurate positioning when the metal sleeve 31 is placed onto the end area of the fitting 1. Movement by the metal sleeve 31 after its placement is prevented by at least one expansion element 36 that extends radially inward. In this example, there are two support elements 36, 37. If the metal sleeve 31 attempts to move, off of the fitting 1 the support elements 36, 37 dig into in the outer circumferential surface of the fitting 1 to prevent the movement. Instead of expansion elements, after the metal sleeve 31 is slipped on, a projecting tab at the left end of the metal sleeve 31 can be bent, so that a second stop 35 is formed at this fitting end face 9 as well. In this way, by the first stop 34 and the second stop 35 the metal sleeve 31 is accurately positioned on the fitting 1 in the form of a preassembly, so that the expansion elements 36, 37 can be omitted.

Figure 2:
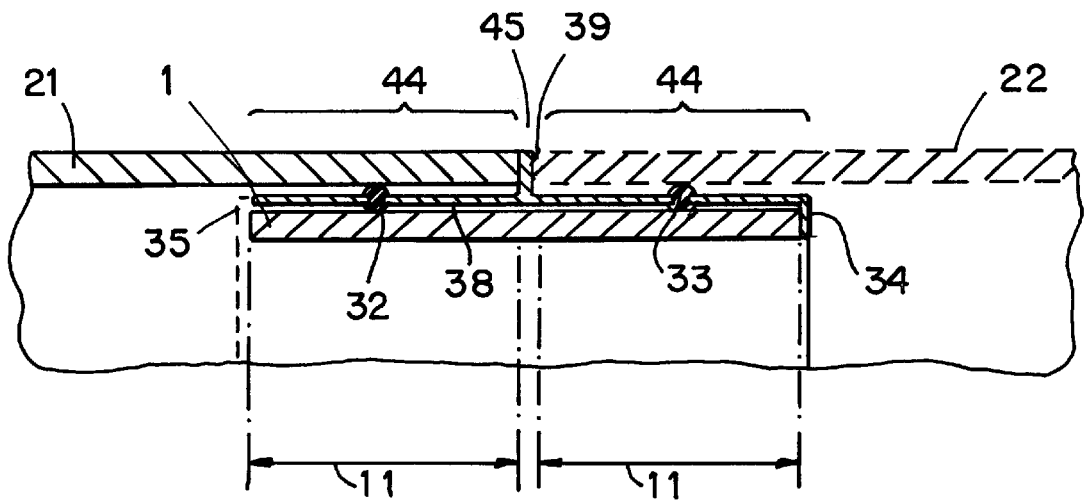
FIG. 2 shows another embodiment of the pipe coupling of FIG. 1.

The metal sleeve 31 includes first sections 44 which indicate the required overlap 11. A second section 45 comprises an indication or mark on the metal sleeve 31. The mark 45 indicates an aligned portion of the ends of the pipes 2.1 and 2.2. The second section 45 is visibly discernible from the first section 44 such, for example, by being a different color than the first section FIG. 2 shows a variant of the example shown in FIG. 1. In this example, the metal sleeve 38 has no expansion elements, but is equipped in the center with a stop 39 that extends radially outward. The stop 39 ensures that the required overlap 11 is maintained for the two pipes 2.1 and 2.2. Therefore said stop 39 comprises the second section 45 in this embodiment.

What is claimed is:

1. A pipe coupling, comprising:

a cylindrical pipe having an end section;

a sleeve-shaped fitting having first and second end faces, said end of said cylindrical pipe inserted on said fitting over one of said first and second end faces;

a metal sleeve forcibly inserted over said fitting and having an axial extension encompassing a length of said fitting between said first and second end faces;

a first sealing ring arranged on said metal sleeve such that a cross section of said first sealing ring is penetrated by said metal sleeve, said first sealing ring being arranged for effecting a seal between said fitting and said pipe;

said metal sleeve comprising an indicator selected from the group consisting of a mark on said metal sleeve and a stop extending radially outward from said metal sleeve, said indicator arranged on said metal sleeve such that said end of said pipe overlaps said fitting by a required overlap length when said end of said pipe is aligned with said indicator; and said pipe and said fitting being securely connectable via a crimp when the end section of said pipe is inserted over said fitting and aligned with said indicator.

2. The pipe coupling of claim 1, wherein said metal sleeve comprises end areas corresponding to said first and second end faces of said fitting and said pipe coupling further comprises a second sealing ring arranged on said metal sleeve for sealing another pipe inserted over the other of said first and second end faces, said first and second sealing rings respectively arranged proximate said end areas of said metal sleeve.

3. The pipe coupling of claim 1, wherein said metal sleeve comprises a support element extending radially inward said support element comprising a portion of said metal sleeve in contact with said fitting for hindering axial movement of said metal sleeve relative to said fitting.

4. The pipe coupling of claim 1, wherein said metal sleeve comprises a radially inward extending stop at one end covering a portion of one of said first and second end faces.

5. The pipe coupling of claim 1, wherein said metal sleeve comprises a radially outward extending stop arranged in a central longitudinal position of said metal sleeve.

6. The pipe coupling of claim 1, wherein said metal sleeve comprises first and second sections on an outer surface of said metal sleeve, said first and second sections being visually distinguishable from each other, said first section corresponding to said required overlap length starting from one of the first and second end faces and said second section comprising said indicator.

7. The pipe coupling of claim 6, wherein said first and second sections of said metal sleeve comprise different colors such that said first and second section are distinguishable from each other by color.

* * * * *